Patented Oct. 30, 1945

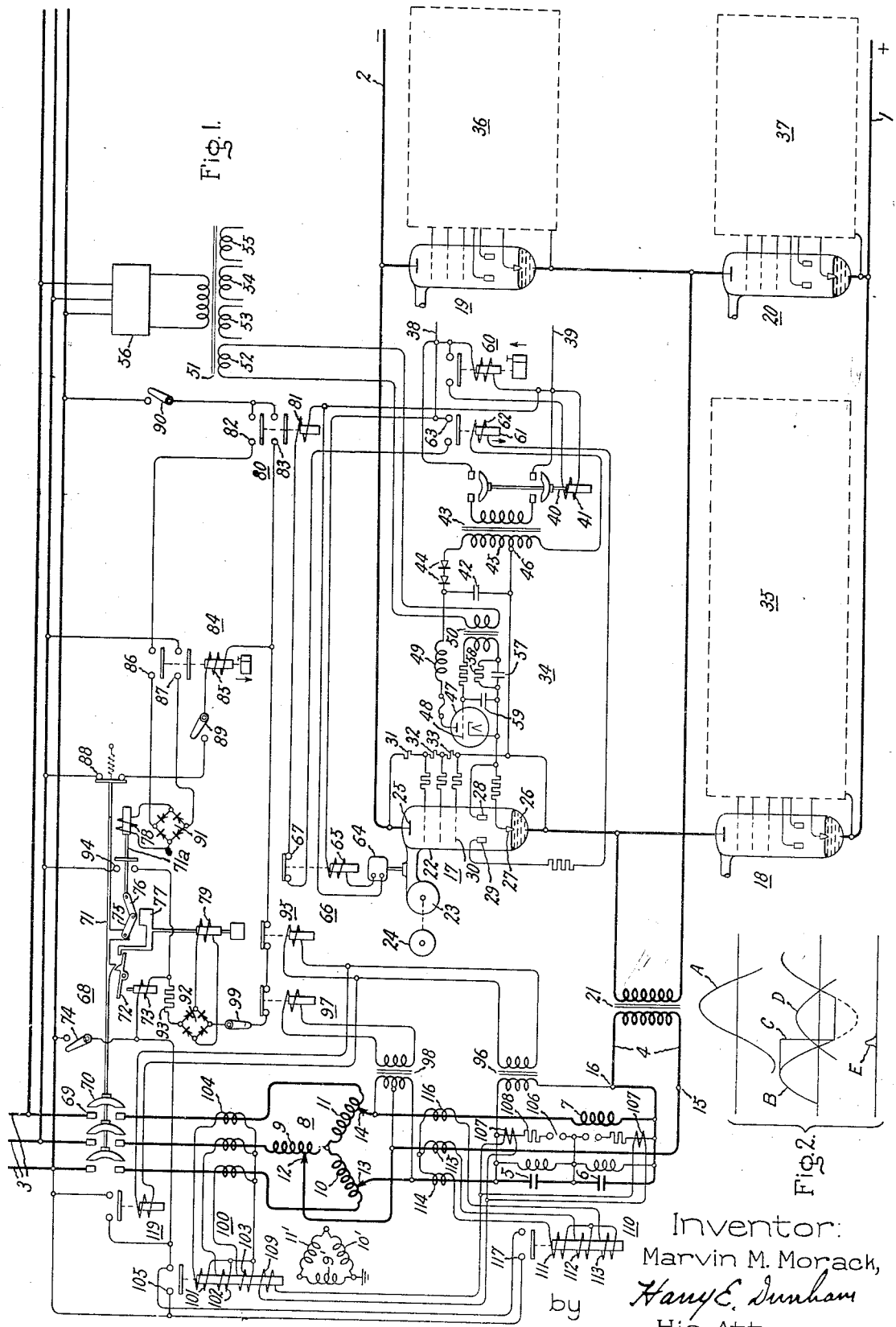

2,388,072

UNITED STATES PATENT OFFICE 2,388,072

ELECTRIC TRANSLATING APPARATUS AND CONTROL EQUIPMENT THEREFOR

Marvin M. Morack, Scotia, N. Y., assignor to General Electric Corporation, a corporation of New York Application May 28, 1942, Serial No. 444,863

32 Claims. (Cl. 175—363)

My invention relates to electric apparatus and more particularly to electric valve translating apparatus and control equipment therefor.

It is an object of my invention to provide new and improved electric translating apparatus.

It is another object of my invention to provide new and improved electric valve translating apparatus.

It is a further object of my invention to provide a new and improved control or excitation circuit for electric valve apparatus.

It is a still further object of my invention to provide new and improved electric valve translating apparatus whereby direct current of constant value is transmitted to a direct current load circuit.

It is a still further object of my invention to provide new and improved control and protective equipment for electric translating apparatus comprising a monocyclic network or circuit.

It is a still further object of my invention to provide new and improved protective circuits for electric valve means.

Briefly stated, in the illustrated embodiment of my invention I provide new and improved apparatus for transmitting an alternating current of constant value to a single phase alternating current circuit from a polyphase alternating current supply circuit of constant voltage, and wherein the system comprises a monocyclic network and associated apparatus for distributing or balancing the load imposed on the phases of the polyphase supply circuit.

In accordance with another feature of my invention, I provide new and improved control and protective circuits for electric translating apparatus including a monocyclic network or circuit.

In accordance with a still further feature of my invention, I provide a new and improved control and protective system for electric valve translating apparatus whereby the energization of the electric valve means is prevented until the ionizable medium thereof is in a condition to conduct current, and for effecting interruption of the source which energizes the electric valve means in the event the medium becomes nonionized. I also provide means in the protective system which differentiates between occasional failure of the medium to become ionized at the desired time and continued or sustained failure.

For a better understanding of my invention, reference may be had to the following description taken in connection with the accompanying drawing, and its scope will be pointed out in the appended claims. Fig. 1 diagrammatically illustrates an embodiment of my invention as applied to a system which transmits unidirectional current of constant value to a load circuit, and Fig. 2 represents certain operating characteristics of the control or excitation circuits for the electric valve means.

Referring now to Fig. 1 of the accompanying drawing, I have there illustrated my invention as applied to an electric translating system for energizing a direct current load circuit, comprising a positive conductor 1 and a negative conductor 2, from a polyphase aternating current supply circuit such as a three phase alternating current circuit 3. In order to transmit constant current to the direct current load circuit including conductors 1 and 2, I provide an alternating current circuit 4 to which is transmitted alternating current of constant value by apparatus described immediately hereinafter.

I provide means, such as a monocyclic network or circuit comprising reactances of opposite sign, such as capacitive reactances and inductive reactances, which transforms constant voltage alternating current into alternating current of constant value, or vice versa. The capacitive reactance of the monocyclic network may comprise capacitances 5 and 6 which may be connected in series relation, as illustrated, or may comprise other combinations of capacitances in series, parallel, or series-parallel. The inductive reactance of the network may be furnished by an inductance 7 which is connected to the capacitances 5 and 6.

As a means for balancing the load imposed on the various phases of the three phase alternating current supply circuit 3 for various load currents supplied to circuit 4 and the associated equipment, I provide a voltage controlling means 8 which is connected between the monocyclic network and the supply circuit 3. The voltage controlling means controls the voltage supplied to the monocyclic network and, hence, controls or adjusts the magnitude of the constant current transmitted to circuit 4. Voltage controlling means 8 may comprise a plurality of Y-connected windings 9, 10 and 11 which are substantially exclusively inductive and which are provided with voltage controlling or adjusting means, such as tap changing means 12, 13 and 14, respectively, which determine the effective value or the output voltage of the respective windings. The voltage controlling means 8 is also provided with a plurality of delta-connected tertiary windings 9', 10' and 11' to provide a path for the harmonic currents. It will be noted that the tap changing means 12 is connected to one terminal 15 of circuit 4 and that tap changing means 13 and 14 are connected to the capacitive and inductive branches, respectively, of the monocyclic network. Terminal 16 of circuit 4 is connected to the common juncture of the capacitive and inductive branches of the single phase monocyclic network.

I provide rectifying means energized from circuit 4 for transmitting unidirectional current of constant value to the load circuit comprising conductors 1 and 2. The rectifying means may comprise electric valve means 17, 18, 19 and 20 which are connected as a full-wave rectifier and connected to circuit 4 through a transformer 21. The electric valve means 17-20, inclusive, are preferably of the type employing an ionizable medium such as a gas or a vapor capable of supporting an arc discharge, and each comprises an enclosing receptable 22 which is evacuated to a predetermined desired pressure. The electric valve means 17-20 may be of the type which are sealed-off or may be of the type wherein the pressure is maintained during operation by means, such as a pump 23, driven by a motor 24. Each of the electric valve means 17-20 includes an anode 25, a cathode 26, and may include an arc initiating means, such as an immersion-ignitor control member 27 associated with the cathode. The immersion-ignitor control member 27 is constructed of a material such as boron carbide or silicon carbide having an electrical resistivity which is high compared with that of the mercury of the associated mercury pool and initiates an arc discharge within the electric valve means when current of a predetermined minimum value is transmitted thereto. The electric valve means 17-20 are each also provided with a relieving anode 28 and excitation means such as a holding anode 29.

As a means for preventing the establishment of excessive voltage gradients within the electric valve means during the period after the normal or intended period of conduction of each of the electric valve means, I may employ within the electric valve means a single grid member or a plurality of grid members 30. Predetermined different components of the anode-cathode voltage are impressed on the grids 30 by means of a voltage divider connected across the anode 25 and cathode 26. This voltage divider may comprise a plurality of resistances 31, 32 and 33, and the grid members 30 may be connected to the desired points of these resistances to obtain the desired voltage gradients between grid members and between anode and cathode.

I also provide excitation circuits 34-37 associated with electric valve means 17-20, respectively, for controlling the electric valve means. Excitation circuits 34-37, inclusive, are similar in construction and arrangement and in order to facilitate the presentation of the invention only excitation circuit 34 associated with electric valve means 17 is shown and described in detail.

Excitation circuit 34 is energized from a source of alternating current including conductors 38 and 39 through a circuit controlling means or switch 40 provided with an actuating coil 41. Excitation circuit 34 also includes a capacitance 42 which is energized from a transformer 43 through means such as a pair of serially connected rectifiers 44. Transformer 43 may comprise a secondary winding 45 having a connection 46 which is intermediate the terminal connections thereof. Impulses of energizing current are transmitted to the immersion-ignitor control member 27 through a discharge circuit for capacitance 42 which includes a control electric valve 47 which is preferably of the type employing an ionizable medium, such as a gas or a vapor, and which includes a control member or grid 48. I employ an inductance 49 connected in series relation with the anode-cathode circuit of control electric valve 47.

To render the control electric valve 47 conducting at predetermined times during the cycle of voltage of supply circuit 3, I impress on the grid 48 a periodic or alternating voltage through a transformer 50 which is energized from the supply circuit 3. Transformer 50 may be connected to circuit 3 through any suitable arrangement and for the purposes of illustration I have chosen to show transformer 50 connected to circuit 3 through a transformer 51 comprising secondary windings 52, 53, 54 and 55. If desired, a phase shifting means 56 may be interposed between the supply circuit 3 and transformer 51. Instead of using the transformer 51, I may employ a voltage divider connected to supply circuit 3 for providing the desired voltage which renders control electric valve 47 conductive. Secondary windings 53-55 are provided for controlling the electric valves 47 in excitation circuits 35-37. In the control circuit for electric valve 47 I also may employ means for producing a negative unidirectional biasing potential, and this means may comprise a parallel connected capacitance 57 and a resistance 58. Capacitance 59 is connected across the grid 48 and the cathode of electric valve 47 in order to absorb undesirable transient voltages which may be present in the control circuit.

As a means for delaying the closure of the switch 40 for a predetermined interval of time after the energization of the alternating current circuit 38, 39, thereby affording a sufficient length of time for the cathode heating elements of control electric valve 47 to obtain a safe operating temperature, I provide a time delay relay 60 which is designed to close its contacts within a definite interval of time, thereby energizing actuating coil 41 of switch 40.

I provide means responsive to the state of ionization of the medium of the electric valve means 17 to perform circuit controlling operations described hereinafter, and which distinguishes from occasional failure of the medium to become ionized at the desired times and sustained or continued failure. This means may comprise a relay 61 having an actuating coil 62 which is connected to be energized by the excitation current conducted by the holding anode or excitation means 29. Holding anode 29 is connected to the lower portion of secondary winding 45 of transformer 43 so that the phase of the voltage supplied to the holding anode 29 leads the anode voltage of electric valve means 17 by an appreciable angle, such as at an angle of 10 electrical degrees so that the voltage for maintaining the arc discharge in the electric valve means during the desired portion of the anode-cathode voltage cycle is effectively present at the time the immersion-ignitor control member 27 is energized.

Relay 61 may be designed so that it maintains its contacts 63 closed during normal operation of the electric valve means 17, and may be provided with suitable arrangements, such as a copper jacket to prevent drop-out upon occasional failure of the medium to become ionized but which does open its contacts 63 if the failure is sustained.

A pressure responsive means 64 is provided and maintains its contacts (not shown) open so long as the pressure of the medium within the electric valve means 17 remains within a predetermined range of values. If the pressure rises above the predetermined desired values, the contacts (not shown) are closed thereby energizing the actuating coil 65 of relay 66 and causing the latter to open its contacts 67.

The translating apparatus, and more particularly the voltage controlling means 8, may be connected to the alternating current supply circuit 3 through circuit controlling means or switching mechanism 68 which comprises relatively movable contacts, such as pairs of stationary contacts 69 and associated movable contacts 70 which are selectively opened and closed by means of an actuating arm 71 which may be spring biased to the open circuit position. A latch member 72 is provided to engage an abutment of the actuating arm 71 to maintain the arm 71 and contacts 69 and 70 in the closed circuit position. A trip coil 73 is provided for tripping the latch 72 either manually, by means of a switch 74, or automatically in response to the occurrence of a predetermined electrical condition of the system by apparatus described hereinafter. I provide a toggle mechanism comprising links 75 and 76, the former of which may be directly connected to the actuating arm 71 and the latter of which is connected to an auxiliary arm 71a. The auxiliary arm 71a is provided with an actuating means or closing coil 78 which when the toggle mechanism is in thrust-transmitting position serves to actuate arm 71 and close contacts 69 and 70.

I provide control means which selectively controls the toggle mechanism including links 75 and 76 to place these links in the thrust-transmitting position or to release these connections, and which also when in the deenergized position engages the latch member 72 to trip the mechanism. This means may comprise an integral member or unitary means 77 and may be actuated electro-magnetically by means of a coil 79, the energization of which is controlled in response to predetermined conditions of the system.

I also provide relay means, such as a master relay means 80 having an actuating coil 81 and contacts 82 and 83 which control, respectively, the energization of the closing coil 78 and coil 79. It will be noted that contacts 67 of relay 66 are connected in series relation with actuating coil 81, and in the event the pressure within the electric valve means 17 increases to a value above the desired range of values, coil 81 is deenergized.

In order to deenergize the closing coil 78 after closure of the switching mechanism 68, I provide a relay such as a time delay relay 84 having an actuating coil 85 and contacts 86 and 87. Coil 85 is energized through a circuit which comprises auxiliary contacts 88 operated by the arm 71 of the switching mechanism 68 so that after the switching mechanism is moved to the closed circuit position, coil 85 is deenergized thereby opening contacts 86 and 87 even though contacts 82 of relay 80 remain closed. A manual switch 89, if desired, may be connected in circuit with actuating coil 85, and a manual initiating switch 90 is connected in series relation with the associated circuits for relays 80 and 84. When it is desired to use unidirectional current for energizing actuating coil 78, a rectifier 91 may be employed.

The control means, for member 77 of the switching mechanism 68 and which includes coil 79, may be designed to drop out in the event the voltage of the alternating current supply circuit 3 decreases to a predetermined value, thereby providing undervoltage protection for the system. This type of control may be afforded in a number of ways, and I have chosen to represent it as including a circuit for energizing the coil 79 through a rectifier 92 which is connected to one phase conductor of the supply circuit 3 through a resistance 93. Of course, the other input terminal of the rectifier 92 is connected to another phase conductor of the supply circuit 3 through other apparatus including contacts 83 of relay 80.

The time of initiation of energization of coil 79 is controlled by means of auxiliary contacts 94 actuated by the auxiliary arm 71a. Contacts 94 may be arranged to close after the auxiliary arm 71a has been moved an appreciable distance due to the energization of closing coil 78.

The control circuit which energizes coil 79 of the control means for the switching mechanism 68 may include means responsive to a predetermined electrical condition of the monocyclic network, such as the voltage appearing across the capacitances 5 and 6 and the inductance 7. This means may comprise a relay 95 having contacts connected in series relation with contacts 83 of relay 80 and rectifier 92 to effect interruption of the control circuit. The actuating coil of relay 95 may be energized by means of transformer 96 connected across the monocyclic network. In addition, a further voltage responsive means, such as a relay 97, may be connected in the control circuit and may have its contacts connected in series relation with relay 95 to interrupt the control circuit and trip the switching mechanism 68 in response to the output voltage of the voltage controlling means 8 or in response to the voltage applied to the monocyclic network. Relay 97 may be energized by means of a transformer 98 which is connected to produce a voltage responsive to all of the three output voltages of the voltage controlling means 8. A switch 99 may be connected in the control circuit to provide a manual means for deenergizing coil 78 and releasing the toggle mechanism, thereby releasing the switching mechanism 68 to the open circuit position.

There is also provided current responsive means for operating the switching mechanism 68. More particularly, I provide means responsive to the current supplied to the translating system for energizing the trip coil 73 of the switching mechanism 68. This current responsive means may comprise a relay 100 including coils 101, 102 and 103 which are energized by current transformers 104 connected in series relation with the windings of the voltage controlling means 8. Relay 100 is also provided with contacts 105 which are connected in series relation with trip coil 73 of switching mechanism 68 to energize the trip coil from one phase of the alternating current supply circuit 3.

I provide protective means for the capacitances 5 and 6 to deenergize the translating system in the event the voltage of the capacitances tend to exceed a predetermined value. The voltage responsive means may comprise a pair of circuits connected across capacitances 5 and 6, respectively, and each may include means responsive to the magnitude of the voltage impressed across the associated capacitance, such as a spark gap 106 which energizes a transformer 107 through a resistance 108 when the voltage of the capacitance exceeds a predetermined value. The transformers 107 may be connected in parallel relation and may be connected to means for tripping the switching mechanism 68 upon the occurrence of excess voltage across the capacitances. One way in which this may be accomplished is by providing relay 100 with an additional actuating coil 109 which operates the relay 100 to effect energization of trip coil 73 of the switching mechanism 68 upon occurrence of overvoltage of capacitance 5 or 6.

I provide means for controlling the operation of the system in response to the current transmitted to the monocyclic network and this means may comprise a relay 110 including actuating coils 111, 112 and 113 which are energized, respectively, by current transformers 114, 115 and 116 connected to the monocyclic network in the manner illustrated. It will be noted that current transformer 115 is responsive to the current transmitted to one terminal of the constant current alternating current circuit 4, and that transformers 114 and 116 are energized in response to the current transmitted to the capacitive reactances and the inductive reactances, respectively, of the monocyclic network. Contacts 117 of relay 110 are connected in parallel with contacts 105 of relay 100, and each of these contacts when closed serves to connect trip coil 73 of the switching mechanism 68 across one phase of the supply circuit 3.

If desired, I may employ an additional voltage responsive means for tripping the switching mechanism 68 in response to the voltage of the monocyclic network by energizing the trip coil 73 in addition to effecting deenergization of the coil 79. For example, a voltage responsive relay 119 may be employed to energize trip coil 73 in response to the voltage of the monocyclic network.

The operation of the embodiment of my invention shown in Fig. 1 will be explained by considering the system first during the initiating operation. Switches 89, 90 and 99 are moved to the closed circuit positions, thereby placing the control circuit for coil 79 and the circuit for energizing closing coil 78 in condition for operation.

A predetermined interval of time after the energization of the alternating current circuit including conductors 38 and 39, relay 60 operates to effect energization of actuating coil 41 of switch 40 thereby energizing the excitation circuit 34. It will be understood that a similar operation takes place in connection with excitation circuits 35—37, inclusive, so that the excitation circuits are energized simultaneously or at about the same time. Upon closure of switch 40, the capacitance 42 is charged through transformer 43 and rectifiers 44, and is discharged at a predetermined time determined by the phase of the alternating voltage impressed on grid 48 of control electric valve 47 by transformer 50. The discharge current of capacitance 42 which is transmitted to immersion-ignitor control member 27 through control electric valve 47 initiates an arc discharge within the electric valve means 17. As soon as an arc discharge is initiated, a large portion of the excitation current is transferred to the relieving anode 28, thereby relieving the duty imposed on the immersion-ignitor control member 27. Furthermore, upon the initiation of the arc discharge the excitation means including the holding anode 29 maintains the arc discharge so long as the voltage produced by the lower portion of secondary winding 45 of transformer 43 remains at a value sufficiently positive to maintain the arc discharge.

As soon as excitation current flows between the holding anode 29 and cathode 26, relay 61 is energized causing the closure of relay 61 and thereby energizing actuating coil 81 of relay 80 from the circuit including conductors 38 and 39. Upon operation of relay 80, the closure of its contacts 83 energizes the actuating coil 85 of relay 84. Relay 84 energizes closing coil 78 of the switching mechanism 68, thereby initiating the closing operation of switching mechanism 68 by moving the auxiliary arm 71a. Upon movement through a predetermined distance, auxiliary contacts 94 of switching mechanism 68 are closed thereby closing the circuit which energizes coil 79. Energization of the coil 79 places the links 75 and 76 of the toggle mechanism in thrust-transmitting relationship so that coil 78, through the auxiliary arm 71a, actuates arm 71 thereby closing the principal contacts 69 and 70. During this operation it will be appreciated that the member 77 does engage the latch 72 so that upon movement to the closed circuit position the arm 71 is latched.

Upon movement of arm 71, contacts 88 are opened thereby deenergizing actuating coil 85 of relay 84 which drops out with a predetermined time delay, thereby assuring that the closing coil 78 is energized for a period of time sufficient to effect complete closure of switching mechanism 68.

The system is then in condition for energizing the load circuit including conductors 1 and 2. Electric valve means 17—20 operate as a full-wave rectifier transmitting unidirectional current to the load circuit. The magnitude of the constant unidirectional current which is transmitted to the load circuit is determined by the voltage controlling means 8 which controls the voltage impressed on the monocyclic network including capacitances 5 and 6 and inductance 7. Adjustment of the tap changing means 12—14 controls the load imposed on the various phases of the three-phase alternating current supply circuit 3, and these tap changing means may be positioned along the windings 9—11, respectively, so that the loads imposed on the various phases are equal.

If the ionizable medium of electric valve means 17, which is mercury vapor in the illustrated embodiment, fails to become ionized at the desired times for a predetermined interval of time established by the design or adjustment of relay 61, relay 61 opens its contacts 63 thereby deenergizing actuating coil 81 of relay 80 and consequently effecting deenergization of coil 79 which releases the member 77. Upon downward movement of member 77, the toggle mechanism is released and the latch 72 is tripped, thereby opening the contacts 69 and 70 of the switching mechanism 68. If subsequently the medium becomes ionized, relay 61 is closed and the above-described closing operation of the switching mechanism 68 is repeated. It will be noted that relay 61 does not drop out upon an occasional failure of the medium to become ionized, but is arranged to operate only if the failure is sustained. Of course, relay 61 may be designed to drop out upon a single failure of the medium to become ionized.

A similar protective operation is afforded by means of pressure responsive means 64 and associated relay 66 which also deenergize coil 81 of relay 80 in the event the pressure within the receptacle 22 of electric valve means 17 departs from the desired or operative range of values. If the pressure, for example, increases to close the contacts of the pressure responsive means 64, coil 65 of relay 66 is energized, thereby deenergizing coil 81 of relay 80 which upon opening its contacts 83 deenergizes coil 79 thereby tripping the switching mechanism 68.

Upon the occurrence of overvoltage of the monocyclic network, relay 95 is energized through transformer 96, thereby deenergizing coil 79 and opening the switching mechanism 68. If the voltage applied to the monocyclic network by voltage controlling means 80 exceeds a predetermined value, relay 97 operates and effects interruption of the circuit connected to coil 79 causing the switching mechanism 68 to open.

If the current supplied to the system increases above a desired value, or if the current transmitted to the monocyclic network rises beyond a prescribed value, relays 100 and 110 operate to energize trip coil 73 thereby disconnecting the system from the supply circuit 3 by operation of the switching mechanism 68.

In the event the voltage impressed across either of the capacitances 5 and 6 rises to an excessively high value, the spark gaps 106 will break down effecting energization of coil 109 of relay 100 and effecting closure of its contacts 105 which energizes trip coil 73 to disconnect the system from the supply circuit 3.

The operation of the excitation circuits, particularly excitation circuit 34, will now be considered in detail. The operating characteristics shown in Fig. 2 may be used in this connection. Curve A represents the anode-cathode voltage of electric valve means 17, and curve B represents the voltage of the upper portion of secondary winding 45 of transformer 43. The blocked curve C represents the voltage of capacitance 42. It will be noted that the voltage of the upper portion of winding 45 leads the anode voltage by an angle somewhat in excess of 180 electrical degrees. I have found that this voltage may be adjusted to lead the anode voltage of electric valve means 17 by 210 electrical degrees. This phase adjustment may be obtained by controlling the phase of the voltage impressed across conductors 38 and 39 relative to the output voltage of transformer 21. Curve D represents the voltage applied to the holding anode 29. This voltage preferably leads the anode voltage of the electric valve means 17 by an angle which is sufficient to assure the holding anode excitation at the time an arc discharge is initiated by the energization of the immersion-ignitor control member 27. An angle in the neighborhood of 30 electrical degrees has been found to be satisfactory. It will be noted that inasmuch as in the particular embodiment illustrated the holding anode excitation is derived from winding 45, the voltage impressed on the holding anode 29 is displaced 180 electrical degrees relative to the voltage supplied to the capacitance 42. Curve E represents the impulse of current transmitted to immersion-ignitor control member 27.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a polyphase alternating current circuit, a single phase alternating current circuit, a single phase monocyclic network comprising a capacitive reactance and an inductive reactance for transforming constant voltage alternating current into alternating current of constant value, and means connected between said polyphase alternating current circuit and said network for effecting a substantially equal distribution of load on the phases of said polyphase alternating current circuit.

2. In combination, a polyphase alternating current circuit, a single phase alternating current circuit, a monocyclic network connected to said single phase alternating current circuit and comprising a capacitive reactance and an inductive reactance for transforming constant voltage alternating current into alternating current of constant value, and inductive means connected between said monocyclic network and said polyphase alternating current supply circuit for balancing the load imposed on the phases of said polyphase circuit.

3. In combination, a three phase alternating current circuit, a single phase alternating current circuit, a single phase monocyclic network connected to said single phase circuit and comprising a capacitive reactance and an inductive reactance for transforming constant voltage alternating current into alternating current of constant value, means connected to said network for balancing the load imposed on the phases of said three phase circuit and comprising three Y-connected windings, one of said windings being connected to one terminal of said single phase circuit and the other two windings being connected respectively to said capacitive reactance and said inductive reactance.

4. In combination, a three phase alternating current circuit, a single phase alternating current circuit, a single phase monocyclic network comprising a capacitive reactance and an inductive reactance for transforming constant voltage alternating current into alternating current of constant value, and means connected to said network for balancing the load imposed on the phases of said three phase circuit and comprising three Y-connected windings each provided with means for controlling the effective voltage thereof, one terminal of said single phase alternating current circuit being connected to the voltage controlling means of one of said windings and the voltage controlling means of the other two windings being connected respectively to said capacitive reactance and said inductive reactance.

5. In combination, a three phase alternating current circuit, a single phase alternating current circuit, a single phase monocyclic network comprising a capacitive reactance and an inductive reactance for transforming constant voltage alternating current into alternating current of constant value, and means connected to said network for balancing the load imposed on the phases of said three phase circuit and comprising three Y-connected windings each provided with tap changing means for controlling the effective voltage obtained therefrom, the tap changing means of one winding being connected to one terminal of said single phase circuit and the tap changing means of the other windings being connected respectively to said capacitive reactance and said inductive reactance.

6. In combination, a polyphase alternating current supply circuit, a single phase alternating current circuit, a network comprising a capacitive reactance and an inductive reactance for transforming constant voltage alternating current into alternating current of constant value, means connected to said network for balancing the load imposed on the phases of said supply circuit, and rectifying means connected to said single phase circuit.

7. In combination, a three phase alternating current supply circuit, an electric circuit, a single phase network including an inductive reactance and a capacitive reactance for transforming constant voltage alternating current into alternating current of constant value, means for balancing the load imposed on the phases of said supply circuit and comprising a network connected between said single phase network and said supply circuit, a load circuit, and full-wave rectifying means connected between said electric circuit and said load circuit.

8. In combination, a polyphase alternating current circuit, a single phase alternating current circuit, single phase means connected between said polyphase circuit and said single phase circuit for transforming constant voltage alternating current into alternating current of constant value, and means connected between said single phase means and said polyphase circuit for effecting a substantially equal distribution of current on the phases of said polyphase alternating current circuit.

9. In combination, a polyphase alternating current circuit, an electric circuit, a single phase monocyclic network connected to said electric circuit for transforming constant voltage alternating current into alternating current of constant value, and means connected between said monocyclic network and said polyphase circuit for controlling the magnitude of the constant current transmitted to said electric circuit.

10. In combination, a polyphase alternating current circuit, a single phase electric circuit, a single phase monocyclic network connected to said electric circuit for transforming constant voltage alternating current into alternating current of constant value, a direct current circuit, electric valve means connected between said electric circuit and said direct current circuit for transforming constant current alternating current into direct current of constant value, and voltage controlling means connected between said network and said polyphase circuit for controlling the magnitude of the current transmitted to said direct current circuit.

11. In combination, a constant voltage alternating current circuit, an electric circuit, a network including an inductive reactance and a capacitive reactance for transforming constant voltage alternating current into alternating current of constant value, means connected between said constant voltage circuit and said network for controlling the voltage impressed on said network, circuit controlling means connected between the constant voltage circuit and the voltage controlling means, and means responsive to the input and output currents of the voltage controlling means for operating said circuit controlling means.

12. In combination, a constant voltage alternating current supply circuit, an electric circuit, a network comprising an inductive reactance and a capacitive reactance for transforming constant voltage alternating current into alternating current of constant value, voltage controlling means connected to said network, circuit controlling means connected between said supply circuit and said voltage controlling means, means responsive to an electrical condition of said network for controlling said circuit controlling means, and means responsive to the output current of said voltage controlling means for operating said circuit controlling means.

13. In combination, a constant voltage alternating current supply circuit, an electric circuit, a network comprising an inductive reactance and a capacitive reactance for transforming constant voltage alternating current into alternating current of constant value, voltage controlling means connected to said network, circuit controlling means connected between said supply circuit and said voltage controlling means, means responsive to an electrical condition of said network for controlling said circuit controlling means, and means responsive to the input and output currents of said voltage controlling means for operating said circuit controlling means.

14. In combination, a constant voltage alternating current supply circuit, an electric circuit, an inductive network connected to said electric circuit and comprising an inductive reactance and a capacitive reactance for transforming constant voltage alternating current into alternating current of constant value, voltage controlling means connected to said inductive network for establishing the magnitude of the current transmitted to said electric circuit, means responsive to overvoltage of said network for operating said circuit controlling means, and means responsive to the current transmitted by said voltage controlling means for controlling said circuit controlling means for disconnecting said voltage controlling means from said supply circuit.

15. In combination, a three phase constant voltage alternating current circuit, a single phase constant current alternating current circuit, a single phase network comprising an inductance and a capacitance for transforming constant voltage alternating current into alternating current of constant value, said network being connected to said electric circuit, three phase voltage controlling means comprising three Y-connected windings including means for controlling the voltage supplied to said network, circuit controlling means connected between said three phase alternating current circuit and said voltage controlling means, and means responsive to the current transmitted by said voltage controlling means for operating said circuit controlling means.

16. In combination, an alternating current supply circuit, an electric circuit, translating apparatus connected between the circuits and comprising a network including a capacitive reactance and an inductive reactance for transforming constant voltage alternating current into alternating current of constant value, voltage controlling means connected to said network, switching means connected between said alternating current circuit and said voltage controlling means and comprising actuating means including a closing coil, a trip coil and control means for assisting said closing coil in the closing operation of said switching means and for tripping said switching means independently of said trip coil, means for energizing said closing coil and said control means for closing said switching means, means responsive to the current transmitted by said voltage controlling means for energizing said trip coil, and means responsive to an electrical condition of said network for deenergizing said control means to open said switching means.

17. In combination, an alternating current circuit, a load circuit, electric translating apparatus connected between said circuits and comprising electric valve means comprising an evacuated receptacle containing an anode, a cathode, and excitation means and employing an ionizable medium capable of supporting an arc discharge, switching means connected between said supply circuit and said translating apparatus including a closing coil and control means which assists in the closing operation of said switching means and which also serves to open said switching means, a circuit for energizing said closing coil, a control circuit for energizing said control means and comprising means responsive to the state of ionization of said medium and the pressure thereof for controlling the energization of said control means.

18. In combination, an alternating current supply circuit, a load circuit, electric translating apparatus connected between the circuits and comprising electric valve means including an evacuated receptacle containing therein an anode, a cathode, excitation means and an ionizable medium capable of supporting an arc discharge, means for energizing said excitation means, switching means connected between said supply circuit and said translating apparatus and comprising actuating means for selectively opening and closing said switching means, and a control circuit connected to said actuating means and comprising means responsive to the state of ionization of said medium and responsive to the pressure of said medium.

19. In combination, an alternating current supply circuit, a load circuit, electric translating apparatus connected between the circuits and comprising electric valve means including an evacuated receptacle containing therein an anode, a cathode, excitation means and an ionizable medium capable of supporting an arc discharge, means for energizing said excitation means, switching means connected between said supply circuit and said translating apparatus and comprising actuating means for selectively opening and closing said switching means, and a control circuit for operating said switching means and connected to said actuating means and comprising means responsive to the current transmitted by said excitation means and means responsive to the pressure of said medium.

20. In combination, an alternating current supply circuit, a load circuit, electric translating apparatus connected between the circuits and comprising electric valve means including an evacuated receptacle containing therein an anode, a cathode, excitation means and an ionizable medium capable of supporting an arc discharge, means for energizing said excitation means, switching means connected between said supply circuit and said translating apparatus and comprising actuating means for selectively opening and closing said switching means, a control circuit responsive to the voltage of said alternating current circuit for operating said actuating means to open said switching means in the event the voltage of said alternating current supply circuit decreases below a predetermined value, and means responsive to said excitation means for controlling said control circuit.

21. In combination, an alternating current circuit, a direct current circuit, electric translating apparatus connected between said circuits and comprising electric valve means of the type comprising an anode, a cathode, excitation means and employing an ionizable medium capable of supporting an arc discharge, circuit controlling means connected between one of said circuits and said translating apparatus, and means responsive to the state of ionization of the medium of said electric valve means for controlling said circuit controlling means to prevent energization of said translating apparatus when said medium is nonionized and for controlling said circuit controlling means to disconnect said translating apparatus when said medium is nonionized.

22. In combination, an alternating current circuit, a direct current circuit, electric translating apparatus connected between said circuits and comprising electric valve means having an anode, a cathode, excitation means and employing an ionizable medium capable of supporting an arc discharge, switching means connected between said translating apparatus and said alternating current circuit and comprising actuating means, a control circuit connected to said actuating means for effecting closure of said switching means, and means connected in said control circuit and responsive to the state of ionization of said medium for preventing energization of said actuating means when said medium is nonionized and for effecting deenergization of said actuating means when said medium becomes nonionized.

23. In combination, an alternating current circuit, a direct current circuit, electric translating apparatus connected between said circuits and comprising an anode, a cathode, excitation means and employing an ionizable medium capable of supporting an arc discharge, circuit controlling means for said translating apparatus, and a control circuit for controlling the operation of said circuit controlling means and comprising means for differentiating between occasional failure of said medium to become ionized and continued failure of said medium to become ionized.

24. In combination, an alternating current circuit, a direct current circuit, electric translating apparatus connected between said circuits and comprising an anode, a cathode, excitation means and employing an ionizable medium capable of supporting an arc discharge, circuit controlling means for said translating apparatus, and a control circuit responsive to said excitation means for controlling the operation of said circuit controlling means upon continued failure of said medium to become ionized.

25. In combination, an alternating current circuit, a direct current circuit, electric translating apparatus connected between said circuits and comprising electric valve means having an anode, a cathode, excitation means and employing an ionizable medium capable of supporting an arc discharge, switching means connected between said translating apparatus and said alternating current circuit and comprising actuating means, a control circuit for controlling the energization of said actuating means and comprising a relay, and a second relay responsive to the state of ionization of said medium and connected to control the first mentioned relay whereby energization of said actuating means is prevented unless said medium is ionized and whereby the energization of said actuating means is interrupted when said medium becomes non-ionized.

26. In combination, an alternating current circuit, a load circuit, electric translating apparatus connected between said circuits and comprising electric valve means of the type employing an ionizable medium capable of supporting an arc discharge and including an anode, a cathode, arc initiating means, a relieving anode and a holding anode, an excitation circuit for transmitting impulses of current jointly to said arc initiating means and to said relieving anode, and means for supplying to said holding anode a voltage which leads the anode voltage in phase relationship.

27. In combination, an alternating current circuit, a load circuit, electric translating apparatus connected between said circuits and comprising electric valve means of the type employing an ionizable medium and including an anode, a cathode, an immersion-ignitor control member, a relieving anode and a holding anode, an excitation circuit for transmitting impulses of current to said immersion-ignitor control member to initiate arc discharges, means for connecting said relieving anode to said excitation circuit so that upon initiation of an arc discharge a substantial portion of the excitation current is transferred from said immersion-ignitor control member to said relieving anode, and means for impressing on said holding anode a voltage which leads the main anode voltage in phase relationship.

28. In combination, an alternating current circuit, a load circuit, electric translating apparatus connected between said circuits and comprising electric valve means of the type employing an ionizable medium which includes an anode, a cathode, an immersion-ignitor control member associated with said cathode, a relieving anode and a holding anode, an excitation circuit for transmitting impulses of current to said control member comprising a capacitance, means for charging said capacitance comprising a source of alternating voltage which leads the anode voltage of said electric valve means, means for discharging said capacitance, means for connecting said relieving anode to the discharge circuit of said capacitance to transfer a substantial portion of the excitation current from said immersion-ignitor control member to said relieving anode upon the initiation of an arc discharge, and means for impressing on said holding anode a voltage which leads the anode voltage of said electric valve means.

29. In combination, an alternating current circuit, a load circuit, electric translating apparatus connected between said circuits and comprising electric valve means of the type employing an ionizing medium capable of supporting an arc discharge and including an anode, a cathode, an immersion-ignitor control member associated with said cathode, a relieving anode and a holding anode, excitation means for transmitting impulses of current to said control member and comprising a capacitance, an alternating current source for energizing said capacitance the voltage of which leads the anode voltage of said electric valve means by an angle greater than 180 electrical degrees, means for connecting said relieving anode to said excitation means to transfer a substantial portion of the excitation current from said immersion-ignitor control member to said relieving anode upon the initiation of an arc discharge, and means for impressing an alternating voltage on said holding anode, said last mentioned voltage leading the anode voltage by substantially 30 electrical degrees.

30. In combination, an alternating current circuit, a load circuit, electric translating apparatus connected between said circuits and comprising electric valve means including an anode, a cathode, an immersion-ignitor control member associated with said cathode, a relieving anode and a holding anode and employing an ionizable medium capable of supporting an arc discharge, an excitation circuit for transmitting impulses of current to said immersion-ignitor control member and comprising means connected to said relieving anode to effect transfer of an appreciable portion of the excitation current from said immersion-ignitor control member to said relieving anode upon the initiation of an arc discharge, and means for energizing said holding anode from said excitation circuit.

31. In combination, an alternating current circuit, a load circuit, electric translating apparatus connected between said circuits and comprising electric valve means employing an ionizable medium and including an anode, a cathode, an immersion-ignitor control member, a relieving anode, a holding anode and a grid member interposed between said anode and said cathode, an excitation circuit for transmitting impulses of current to said immersion-ignitor control member to initiate arc discharges, means for connecting said relieving anode to said initiation circuit so that upon initiation of an arc discharge an appreciable portion of the excitation current is transferred from the immersion-ignitor control member to said relieving anode, means for impressing on said holding anode a voltage to maintain an arc discharge after initiation thereof by the energization of said immersion-ignitor control member, and means comprising a voltage divider connected across said anode and said cathode for impressing a predetermined component of the anode-cathode voltage on said grid member.

32. In combination, an alternating current circuit, a load circuit, electric translating apparatus connected between said circuits and comprising electric valve means of the type employing an ionizable medium capable of supporting an arc discharge and including an anode, a cathode, an immersion-ignitor control member, a relieving anode, a holding anode and a plurality of spaced grid members in the path of the arc discharge between said anode and said cathode, an excitation circuit for transmitting impulses of current to said immersion-ignitor control member to initiate arc discharges, means for connecting said relieving anode to said excitation circuit so that upon initiation of an arc discharge an appreciable portion of the excitation current is transferred from the immersion-ignitor control member to said relieving anode, and means for impressing on said holding anode a voltage to maintain an arc discharge within said electric valve means during a predetermined portion of each cycle of the voltage of said supply circuit after the initiation of an arc discharge by the energization of said immersion-ignitor control member, and means comprising a voltage divider connected across said anode and said cathode for impressing on said grid members different predetermined components of the anode-cathode voltage.

MARVIN M. MORACK.